United States Patent
Ke et al.

(10) Patent No.: US 11,238,165 B2
(45) Date of Patent: Feb. 1, 2022

(54) FILE ENCRYPTION METHOD, FILE DECRYPTION METHOD, ELECTRONIC DEVICE, AND STORAGE MEDIUM

(71) Applicant: TENCENT TECHNOLOGY (SHENZHEN) COMPANY LIMITED, Guangdong (CN)

(72) Inventors: Wei Bin Ke, Shenzhen (CN); Zhi Yong Lai, Shenzhen (CN); De Cong Zhen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 446 days.

(21) Appl. No.: 16/121,033

(22) Filed: Sep. 4, 2018

(65) Prior Publication Data

US 2018/0365434 A1 Dec. 20, 2018

Related U.S. Application Data

(63) Continuation of application No. PCT/CN2017/074337, filed on Feb. 22, 2017.

(30) Foreign Application Priority Data

Mar. 3, 2016 (CN) .......................... 201610126406.3

(51) Int. Cl.
  *G06F 21/60* (2013.01)
  *H04L 9/08* (2006.01)
  *G06F 21/62* (2013.01)
  *G06F 21/78* (2013.01)

(52) U.S. Cl.
  CPC ........ *G06F 21/602* (2013.01); *G06F 21/6209* (2013.01); *G06F 21/78* (2013.01);
  (Continued)

(58) Field of Classification Search
  CPC .... G06F 21/602; G06F 21/6209; G06F 21/78; G06F 2221/2107; H04L 9/0869; H04L 9/0894; H04L 2209/60
  See application file for complete search history.

(56) References Cited

U.S. PATENT DOCUMENTS

| 2009/0006796 A1* | 1/2009 | Chang | ...................... G06F 21/79 711/163 |
| 2010/0058061 A1* | 3/2010 | Folta | ....................... G06F 21/14 713/171 |

(Continued)

FOREIGN PATENT DOCUMENTS

| CN | 1726713 A | 1/2006 |
| CN | 102867153 A | 1/2013 |

(Continued)

OTHER PUBLICATIONS

International Search Report for PCT/CN2017/074337 dated Apr. 21, 2017 [PCT/ISA/210].

(Continued)

*Primary Examiner* — Hee K Song
(74) *Attorney, Agent, or Firm* — Sughrue Mion, PLLC (57) ABSTRACT

A method performed by at least one computer processor, the method comprising: obtaining an original file to be encrypted; encrypting header data of the original file to obtain encrypted header data, the header data comprising metadata of the original file; storing the encrypted header data; recording, to correspond to a file identifier of the original file, a first storage path of the encrypted header data; partitioning file data other than the header data in the original file, into segments; storing the segments in a disordered fragment sequence; and recording, to correspond to the file identifier, second storage paths of the segments along with an actual sequence of the segments in the original file.

20 Claims, 5 Drawing Sheets

(52) U.S. Cl.
CPC .......... *H04L 9/0869* (2013.01); *H04L 9/0894* (2013.01); *G06F 2221/2107* (2013.01); *H04L 2209/60* (2013.01)

(56) References Cited

U.S. PATENT DOCUMENTS

| | | | |
|---|---|---|---|
| 2011/0191577 A1* | 8/2011 | Tian .......................... | H04L 9/00 713/150 |
| 2013/0182837 A1 | 7/2013 | Maliszewski et al. | |
| 2014/0013112 A1* | 1/2014 | Cidon ................... | G06F 16/137 713/165 |
| 2015/0113279 A1* | 4/2015 | Andersen ............ | G06F 21/6218 713/171 |
| 2016/0117518 A1* | 4/2016 | Cao ..................... | G06F 21/6209 713/165 |
| 2017/0083712 A1* | 3/2017 | Hasegawa ............. | G06F 3/0623 |

FOREIGN PATENT DOCUMENTS

| | | |
|---|---|---|
| CN | 103279693 A | 9/2013 |
| CN | 105187204 A | 12/2015 |
| CN | 105279440 A | 1/2016 |

OTHER PUBLICATIONS

Communication dated Oct. 23, 2019 from the State Intellectual Property Office of the P.R.C. in application No. 201610126406.3.
Written Opinion from the International Bureau in International Application No. PCT/CN2017/074337 dated Apr. 21, 2017.

* cited by examiner

FILE ENCRYPTION METHOD, FILE DECRYPTION METHOD, ELECTRONIC DEVICE, AND STORAGE MEDIUM

CROSS-REFERENCE TO RELATED APPLICATION

This application is a continuation of International Application No. PCT/CN2017/074337, filed on Feb. 22, 2017, which claims priority to Chinese Patent Application No. 201610126406.3, entitled "FILE ENCRYPTION METHOD AND DEVICE AND FILE DECRYPTION METHOD AND DEVICE" filed on Mar. 3, 2016, in the Chinese Patent Office, the disclosures of which are incorporated by reference in their entireties.

BACKGROUND

1. Field

This application relates to the technical field of data security, and in particular, to a file encryption method, a file decryption method, an electronic device, and a storage medium.

2. Description of Related Art

In some application scenarios, a file needs to be protected by encrypting it to prevent the file contents from being illegally accessed. For example, a streaming media file is required to be encrypted when being stored in a local user terminal so that a third-party application cannot access the contents helping to protect copyrights.

An existing file encryption technology uses binary encryption to encrypt the entire text of the file. A corresponding decryption manner requires performing binary decryption to the entire text of the file. A central processor is greatly consumed in the encryption and the decryption processes and therefore the time consumed for the encryption and the decryption are high.

SUMMARY

According to an aspect of one or more example embodiments, there is provided a file encryption method, a file decryption method, an electronic device, and a storage medium.

According to an aspect of one or more example embodiments, there is provided a method for a file encryption. The method is performed by at least one computer processor. An original file to be encrypted is obtained. Header data of the original file is encrypted to obtain encrypted header data, the header data including metadata of the original file. The encrypted header data is stored. A first storage path of the encrypted header data is recorded, to correspond to a file identifier of the original file. File data other than the header data in the original file is partitioned into segments. The segments in a disordered fragment sequence are stored, and second storage paths of the segments along with an actual sequence of the segments in the original file is recorded.

According to an aspect of one or more example embodiments, there is provided an electronic device for file encryption. The electronic device includes at least one memory configured to store computer program code; and at least one processor configured to access the at least one memory and operate according to the computer program code, the computer program code including: obtaining code configured to cause the at least one processor to obtain an original file to be encrypted; encrypting code configured to cause the at least one processor to encrypt header data of the original file to obtain encrypted header data, the header data including metadata of the original file; storing code configured to cause the at least one processor to store the encrypted header data; recording code configured to cause the at least one processor to record, to correspond to a file identifier of the original file, a first storage path of the encrypted header data; partitioning code configured to cause the at least one processor to partition file data other than the header data in the original file, into segments, wherein the storing code is further configured to cause the at least one processor to store the segments in a disordered fragment sequence; and wherein the recording code is further configured to cause the at least one processor to record, to correspond to the file identifier, a second storage paths of the segments alone with an actual sequence of the segments in the original file.

According to an aspect of one or more example embodiments, there is provided a non-transitory computer-readable storage medium that stores computer program code, when executed by one or more processors, causing the one or more processors to perform: obtaining an original file to be encrypted; encrypting header data of the original file to obtain encrypted header data, the header data including metadata of the original file; storing the encrypted header data; recording, to correspond to a file identifier of the original file, a first storage path of the encrypted header data; partitioning file data other than the header data in the original file, into segments; storing the segments in a disordered fragment sequence; and recording, to correspond to the file identifier, second storage paths of the segments and alone with an actual sequence of the segments in the original file.

BRIEF DESCRIPTION OF THE DRAWINGS

The accompanying drawings described herein are used for providing further understanding for this application and constitute a part of this application. Example embodiments of this application and descriptions thereof are used for explaining this application and do not constitute an improper limitation to this application. A person of ordinary skill in the art may still derive other drawings from these accompanying drawings without creative efforts.

DETAILED DESCRIPTION OF THE EXAMPLE EMBODIMENTS

To make the objectives, technical solutions, and advantages of this application clearer and more comprehensible, the following further describes this application in detail with reference to the accompanying drawings and example embodiments. It should be understood that the specific example embodiments described herein are merely used to explain this application, and are not intended to limit this application. It should note that the example embodiments to be described are some rather than all of the example embodiments of this application. All other embodiments obtained by a person skilled in the art based on the example embodiments of the present application without creative efforts shall fall within the protection scope of the present application.

Figure 1:
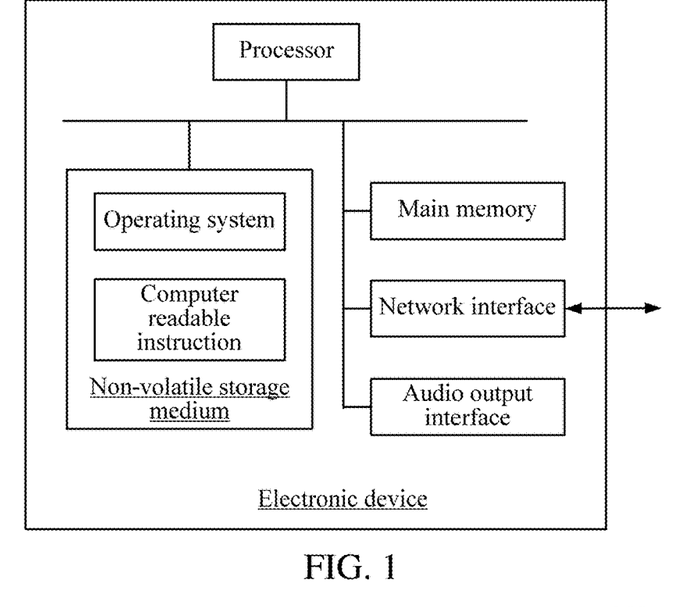
FIG. 1 is a schematic diagram of an inner structure of an electronic device according to an example embodiment.

As shown in FIG. 1, an electronic device is provided according to an example embodiment. The electronic device may include a processor, a non-transitory computer-readable storage medium, a main memory, a network interface, and an audio output interface that are connected by using a system bus. The processor has a computing function and a function of controlling working of the electronic device. The processor is configured to perform a file encryption method and a file decryption method. The non-transitory computer-readable storage medium includes a magnetic storage medium, an optical storage medium, and a flash storage medium. The non-transitory computer-readable medium stores an operating system, and further stores computer readable instructions. The computer readable instructions are used to implement a file encryption method and/or a file decryption method. The main memory is configured to provide caches for the operating system and the computer readable instructions. The network interface is configured to connect to a network. The audio output interface is configured to output audio data that is processed and obtained by the processor as an audio signal.

Figure 2:
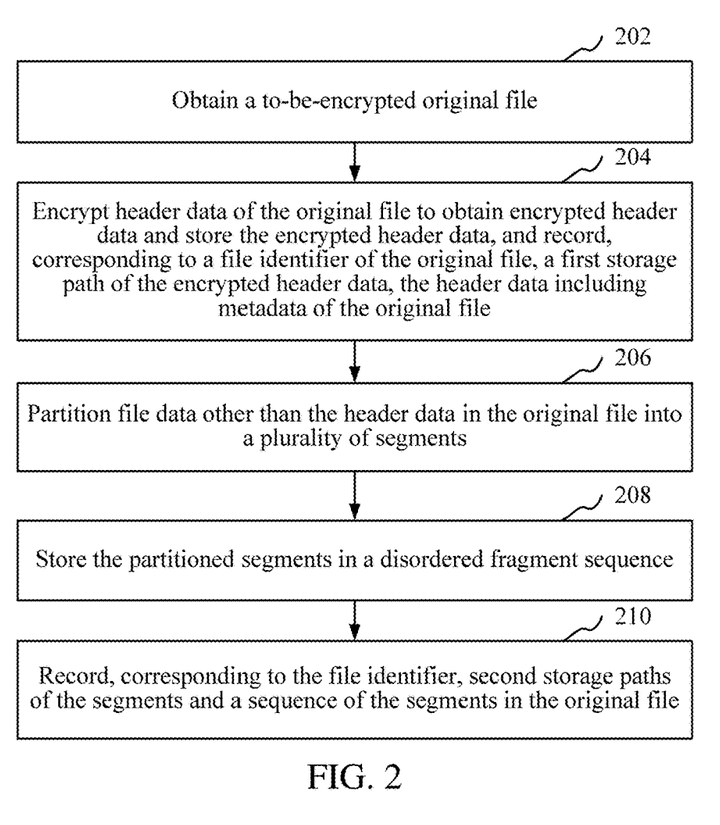
FIG. 2 is a schematic flowchart of a file encryption method according to an example embodiment.

As shown in FIG. 2, \a file encryption method is provided according to an example embodiment. This example embodiment is described by using an example in which the method is applied to the electronic device in FIG. 1 as an example. The method specifically includes the following steps 202 to 210.

In Step 202, obtain an original file to-be-encrypted.

The original file refers to a raw file that is not encrypted. The original file may be a media file, a picture, a compressed package file, a text file, or a rich text file. The media file includes a streaming media file and a local media file. The media file is, for example, a video file or an audio file. The electronic device may download the to-be-encrypted original file by means of the network, or may obtain the original file to-be-encrypted from the local.

In Step 204, encrypt header data of the original file to obtain encrypted header data and store the encrypted header data, and record, corresponding to a file identifier of the original file, a first storage path of the encrypted header data, the header data including metadata of the original file.

The header data is a part of data located at a head of the original file. The size of the header data may be set according to requirements, for example, may be 100 KB, and the header data is required to cover the metadata of the original file. The metadata refers to data describing data content of the original file. For example, if the original file is a video stream file, the metadata may include a video format, video time information, a bit rate, a file size, a director, an actor or actress, a production unit, and the like.

The electronic device may encrypt the header data by using various binary encryption algorithms, to obtain the corresponding encrypted header data. The electronic device may encrypt the header data by using the binary encryption algorithm such as an advanced encryption standard (AES) algorithm or a data encryption standard (DES) algorithm.

The electronic device stores the encrypted header data obtained by encryption, and records a storage path of the encrypted header data in a record that uses the file identifier of the original file as an index. To distinguish the storage path from other storage paths described below, the storage path of the encrypted header data is referred to as a first storage path. The file identifier of the original file may only identify the corresponding original file, and may include one or a combination of more than one of a digit, a letter, a punctuation mark, and a Chinese character.

In Step 206, partition file data other than the header data in the original file into segments.

Specifically, in an example embodiment, the electronic device may partition the file data other than the header data in the original file into a plurality of segments according to a preset single segment size. For example, if the preset single segment size is 1 M (megabyte), the electronic device may partition, one by one, the remaining file data into segments of 1 M after removing the header data from the original file, where last file data that is smaller than 1 M is a final segment that is partitioned.

In an example embodiment, the electronic device may equally or randomly partition the file data other than the header data in the original file into a preset quantity of segments. Specifically, the electronic device may partition the remaining file data into the preset quantity of segments after removing the header data from the original file. During the partition, an equal partition manner may be used, that is, the sizes of the partitioned segments are equal; or a random partition manner may be used, that is, the size of each segment in the preset quantity of segments is randomly allocated.

The quantity of the partitioned segments may be controlled according to an encryption level and/or a response time level. Specifically, if the encryption level is higher, the quantity of the partitioned segments is larger, and the file is more difficult to be broken after being encrypted; and if the encryption level is lower, the quantity of the partitioned segments may be reduced. If the response time level is higher, that is, shorter response time is required, the quantity of the partitioned segments needs to be reduced; and if the response time level is lower, the quantity of the partitioned segments may be increased.

In Step 208, store the partitioned segments in a disordered fragment sequence.

Specifically, the electronic device independently stores each partitioned segment, and disorders the fragment sequence when performing the storage so that a sequence of the segments in the original file cannot be recognized from the storage path after the segments are stored.

In an example embodiment, step 208 includes allocating a random new file name for each segment, and storing, in a specified file directory or a randomly created file directory, each segment into a segment file that is named after a corresponding new file name.

The electronic device may generate a plurality of different random character strings of which a quantity is equal to the quantity of the segments. Each random character string is respectively allocated to one of the plurality of segments so that each segment uses the corresponding random character string as the new file name. The electronic device stores each segment as an independent file that is referred to as a segment file, and names the stored segment file by the allocated new file name.

The segment file may be stored in a specified directory. For example, a folder with a random folder name is created, so as to store all partitioned segment files in the created folder. The electronic device may alternatively randomly create a new file directory for each segment file, so as to store each segment file in the corresponding file directory. The file directory of each segment file may be different.

In Step 210, record, corresponding to the file identifier, second storage paths of the segments and a sequence of the segments in the original file.

The electronic device may generate a record on a private database of an application that implements the file encryption method according to this example embodiment of this application. The record may use the file identifier of the original file as an index. The first storage path, the second storage paths, and the sequence (i.e., an actual sequence) of the segments in the original file are stored in the record. The private database may be stored in the local or network. Authentication is required to access the private database, thereby ensuring security. The second storage paths refer to storage paths of the stored segments. Recording the sequence of the segments may be performed by recording a sequence of the corresponding segment files based on the sequence of the segments in the original file, or may be by allocating a unique segment sequence number in a disordered sequence for each segment, so as to record a sequence of the segment sequence numbers according to the sequence of the segments in the original file. The electronic device may further record a file check value, for example, a Message Digest Algorithm (MD5, that is, version 5 of the message-digest algorithm) value, of the original file, so as to check integrity of the original file according to the file check value after the original file is obtained by decryption.

In an example embodiment, the electronic device may further perform format masquerading to a file generated in a process of implementing the file encryption method. For example, an extension name of the generated file is modified to be an extension name in another file format. The generated file includes a file in which the encrypted header data is located and files in which the segments are located. When performing decryption, a format of the file performed with the format masquerading needs to be restored.

According to the foregoing file encryption method, only the header data of the original file is encrypted during the encryption of the original file, a data volume for an encryption calculation being small. Moreover, the file data other than the header data in the original file is partitioned into a plurality of segments, and subsequently is stored in a disordered fragment sequence, calculation amounts for partitioning and storing in a disordered fragment sequence being small. Compared with a current encryption manner of performing binary encryption to an entire text, consumption of a central processor may be significantly reduced by using the file encryption method, resulting in low time costs for the encryption. Recording of the first storage path, the second storage paths, and the sequence of the segments enables a file to be decryptable after being encrypted. Moreover, the metadata is used to describe the data content in the original file. The encrypted header data covers the metadata of the original file, so as to prevent a malicious user from breaking the encryption by positioning the encrypted file by using the metadata and obtaining the segments stored in a disordered fragment sequence.

Figure 3:
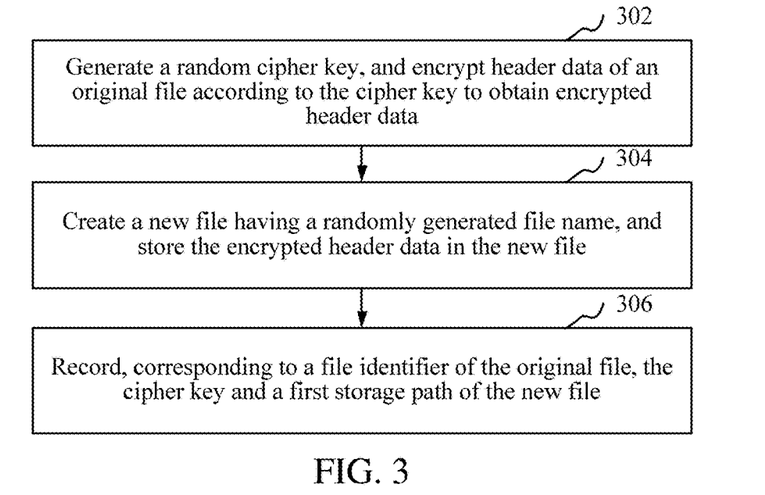
FIG. 3 is a schematic flowchart of a step of encrypting header data of an original file to obtain encrypted header data and store the encrypted header data, and recording, corresponding to a file identifier of the original file, a first storage path of the encrypted header data according to an example embodiment.

As shown in FIG. 3, step 204 may include the following steps 302-306 according to an example embodiment.

In Step 302, generate a random cipher key, and encrypt the header data of the original file based on the cipher key to obtain the encrypted header data.

Specifically, the electronic device may generate a random first hash value by using a random hash algorithm, and use the random first hash value as the cipher key. Therefore, the electronic device may convert, based on the cipher key, the header data of plaintext into the encrypted header data of ciphertext. The random cipher key is generated to avoid breaking of a third party as possible.

In Step 304, create a new file having a randomly generated file name, and store the encrypted header data in the new file.

Specifically, the electronic device may generate a random second hash value by using the random hash algorithm, and use the random second hash value as a file name to create the new file, so as to store the encrypted header data obtained by encryption in the new file. The electronic device may alternatively use current time as a random seed to generate a random file name. Storing the encrypted header data by creating a new file having a randomly generated file name may further avoid positioning and breaking of the third party.

In Step 306, record, corresponding to the file identifier of the original file, the cipher key and a first storage path of the new file.

Specifically, the electronic device may store, in the private database, the cipher key and the first storage path of the new file in the record that uses the file identifier of the original file as the index, so as to position, according to the first storage path, the file in which the encrypted header data is located when decryption is performed, and to decrypt the encrypted header data according to the cipher key.

In this example embodiment, generating a random cipher key to encrypt the header data may prevent the cipher key from being broken by the third party. Therefore, storing the encrypted header data by generating a random file name may prevent the encrypted header data from being easily obtained, so as to further ensure security of the file after the file is encrypted.

In another example embodiment, the original file is a streaming media file downloaded by a streaming application. The first storage path, the second storage paths, and the sequence are recorded, corresponding to the file identifier, in a private database corresponding to the streaming application.

Figure 4:
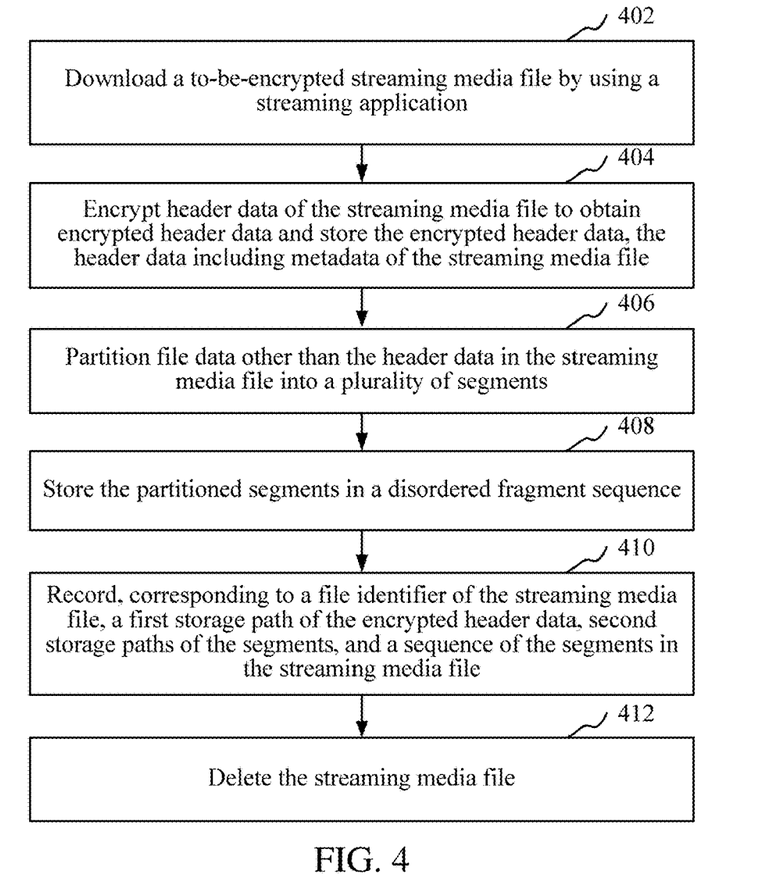
FIG. 4 is a schematic flowchart of a file encryption method according to another example embodiment.

As shown in FIG. 4, a file encryption method is provided according to an example embodiment. The file encryption method may include the following steps 402-412.

In Step 402, download a to-be-encrypted streaming media file by using a streaming application.

Specifically, an electronic device may be connected to a streaming server by using the streaming application to download a streaming media file from the streaming server to serve as the to-be-encrypted streaming media file. The streaming application refers to an application capable of processing a streaming media, for example, a streaming playback application or a streaming editing application.

In Step 404, encrypt header data of the streaming media file to obtain encrypted header data and store the encrypted header data, the header data including metadata of the streaming media file.

Specifically, the electronic device may generate a random cipher key, and encrypt header data of an original file based on the cipher key to obtain the encrypted header data. The electronic device may create a new file having a randomly generated file name, and store the encrypted header data in the new file.

In Step 406, partition file data other than the header data in the streaming media file into a plurality of segments.

Specifically, the electronic device may partition file data other than the header data in the original file into a plurality of segments based on a preset single segment size. The electronic device may alternatively equally or randomly partition the file data other than the header data in the original file into a preset quantity of segments.

In Step 408, store the partitioned segments in a disordered fragment sequence.

In Step 410, record, corresponding to a file identifier of the streaming media file, a first storage path of the encrypted header data, second storage paths of the segments, and a sequence of the segments in the streaming media file.

Specifically, the electronic device may create a record that uses the file identifier as an index in a private database corresponding to the streaming application, and store the cipher key, the first storage path, the second storage paths, and the sequence of the segments in the streaming media file in the record.

In Step 412, delete the streaming media file.

Specifically, the electronic device deletes the streaming media file after finishing encryption of the streaming media file. In an example embodiment, the electronic device may play the streaming media file after the streaming media file is downloaded, perform step 402 to step 410, and delete the downloaded streaming media file after playing is completed.

In this example embodiment, for requirements on copyright protection of the streaming media file, using the file encryption method according to this example embodiment of this application may improve the encryption efficiency while ensuring encryption performance, so as to improve the efficiency of processing the streaming media file.

Figure 5:
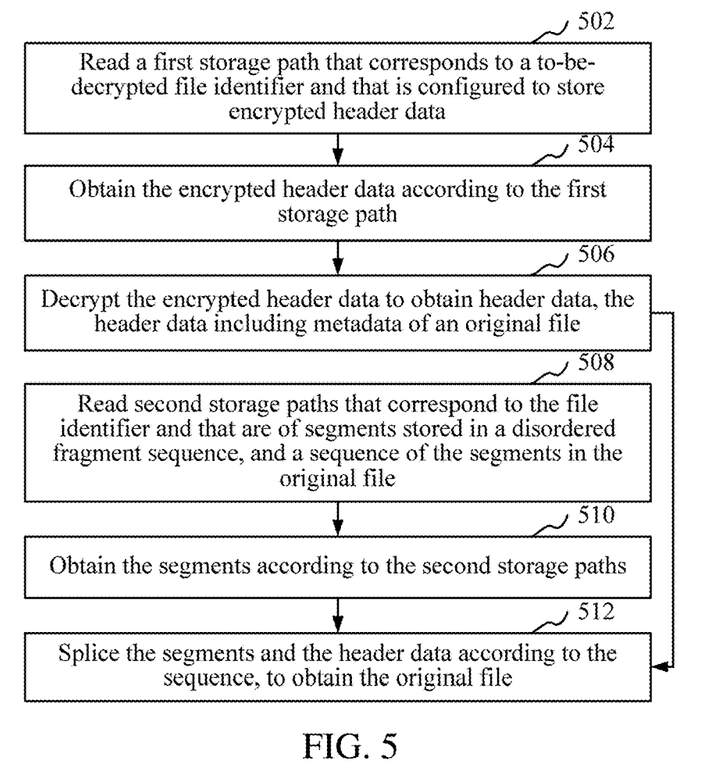
FIG. 5 is a schematic flowchart of a file decryption method according to an example embodiment.

As shown in FIG. 5, a file decryption method is provided according to an example embodiment. This example embodiment is described by using an example in which the method is applied to the electronic device in FIG. 1 as an example. The method may include the following steps 502 to 512:

In Step 502, read a first storage path that corresponds to a to-be-decrypted file identifier and that is configured to store encrypted header data.

Specifically, the electronic device may implement the file decryption method according to this example embodiment to restore the original file when the original file needs to be used, after the foregoing file encryption method is implemented. The electronic device may specifically obtain the to-be-decrypted file identifier, search a record that uses the file identifier as an index from a private database of an application, and read the first storage path and a cipher key from the found record. The first storage path is a path for storing the encrypted header data.

In Step 504, obtain the encrypted header data according to the first storage path.

Specifically, the electronic device searches a file in a corresponding file directory based on the first storage path, so as to read the encrypted header data from the found file.

In Step 506, decrypt the encrypted header data to obtain header data, the header data including metadata of an original file.

Specifically, the electronic device may decrypt the header data from the encrypted header data according to the read cipher key. A binary decryption algorithm may be used for decryption. Specifically, a binary decryption algorithm such as an AES algorithm or a DES algorithm may be used.

In Step 508, read second storage paths that correspond to the file identifier and that are of segments stored in a disordered fragment sequence, and a sequence of the segments in the original file.

Specifically, the electronic device, when encrypting the original file, partitions file data other than the header data in the original file into a plurality of segments, and stores the partitioned segment in a disordered fragment sequence, so that the sequence of the segments in the original file cannot be recognized from the storage path after the segments are stored. In addition, the electronic device records the second storage paths and the sequence of the segments in the original file for reading when performing decryption.

In Step 510, obtain the segments according to the second storage paths.

Specifically, the electronic device searches a file in a corresponding file directory based on the read second storage paths, and obtains, in the found file, the segments partitioned from the original file.

Step 512: Splice the segments and the header data according to the sequence, to obtain the original file.

Specifically, the electronic device creates a temporary file, writes the header data in the temporary file, and writes, after the header data, the segments in the temporary file according to a sequence, so as to splice the header data and the segments, to obtain an entire original file.

In an example embodiment, the electronic device may further read a file check value that is of the original file and that is stored by means of corresponding to the file identifier, so as to check based on the read file check value. Decryption is completed if the check succeeds, and prompt information indicating that the decryption has an error is sent if the check fails. Specifically, during the check, a file check value of the original file obtained by splicing may be calculated, and the calculated file check value may be compared with the read file check value. The check succeeds if the calculated file check value is consistent with the read file check value, and the check fails if the calculated file check value is inconsistent with the read file check value.

According to the foregoing file decryption method, the encrypted header data is positioned by using the recorded first storage path, and the encrypted header data is decrypted to obtain the header data; and the segments are positioned and obtained by using the recorded second storage paths, so as to splice the header data and the segments according to the recorded sequence, to obtain the original file. During the decryption, only the encrypted header data needs to be performed with a decryption calculation, a data volume for the decryption calculation is small, and time costs for splicing the segments are low. Compared with a current decryption manner of performing binary decryption to an entire text, consumption of a central processor may be significantly reduced by using the file decryption method, resulting in low time costs for the decryption. Moreover, the metadata is used to describe data content in the original file. The encrypted header data covers the metadata of the original file, so as to prevent a malicious user from breaking the encryption by positioning the encrypted file by using the metadata and obtaining the segments stored in a disordered fragment sequence.

In an example embodiment, the original file is a streaming media file; and the first storage path, the second storage paths, and the sequence are read from a private database corresponding to a streaming application. A step of playing the original file, and removing the original file after play is completed is further included after step 512.

Specifically, the electronic device may decrypt according to the corresponding file identifier to obtain the streaming media file and play the streaming media file when the streaming media file needs to be played. The streaming media file is a temporary file, and is removed after the play is completed. The streaming media file is decrypted to play again if replay is required.

In this example embodiment, the file decryption method is applied to decrypting the streaming media file, so as to improve the decryption efficiency while ensuring an encryption performance. The streaming media file is decrypted instantly when the streaming media file is required to be played, without affecting initial response time and play smoothness of playing the streaming media file, so that the streaming media file is protected, and additional performance consumption brought by the encryption and the decryption is greatly reduced, thereby considering both security and performances, and ensuring rights and interests of a copyright party and user experience.

Figure 6:
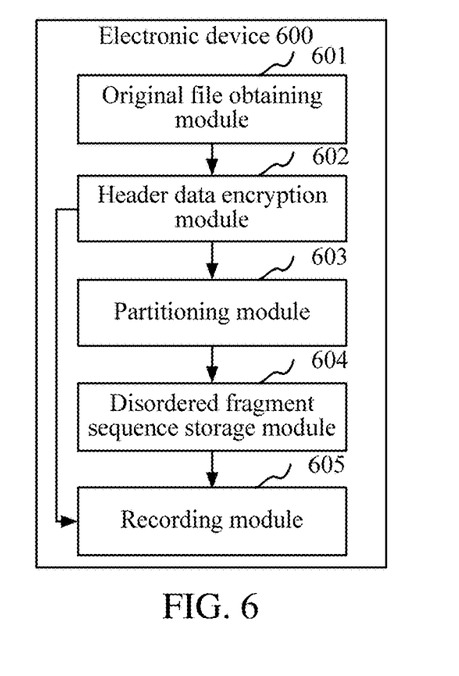
FIG. 6 is a structural block diagram of an electronic device according to an example embodiment.

As shown in FIG. 6, an electronic device 600 is provided according to an example embodiment. The electronic device 600 may include an original file obtaining module 601, configured to obtain a to-be-encrypted original file; a header data encryption module 602, configured to encrypt header data of the original file to obtain encrypted header data and store the encrypted header data, the header data including metadata of the original file; a partitioning module 603, configured to partition file data other than the header data in the original file into a plurality of segments; a disordered fragment sequence storage module 604, configured to store the partitioned segments in a disordered fragment sequence; and a recording module 605, configured to record, corresponding to a file identifier of the original file, a first storage path of the encrypted header data. Second storage paths of the segments and a sequence of the segments in the original file are recorded by means of corresponding to the file identifier.

According to the foregoing electronic device 600, only the header data of the original file is encrypted during the encryption of the original file, a data volume for an encryption calculation being small. Moreover, the file data other than the header data in the original file is partitioned into a plurality of segments, and subsequently is stored in a disordered fragment sequence, calculation amounts for partitioning and storing in a disordered fragment sequence being small. Compared with a current encryption manner of performing binary encryption to an entire text, consumption of a central processor may be significantly reduced by using the electronic device, resulting in low time costs for the encryption. Recording of the first storage path, the second storage paths, and the sequence of the segments enables a file to be decryptable after being encrypted. Moreover, the metadata is used to describe data content in the original file. The encrypted header data covers the metadata of the original file, so as to prevent a malicious user from breaking the encryption by positioning the encrypted file by using the metadata and obtaining the segments stored in a disordered fragment sequence.

In an example embodiment, the header data encryption module 602 is specifically configured to generate a random cipher key, and encrypt the header data of the original file based on the cipher key to obtain the encrypted header data; and create a new file having a randomly generated file name, and store the encrypted header data in the new file.

The recording module 605 is further configured to record, corresponding to the file identifier of the original file, the cipher key and a first storage path of the new file.

In this example embodiment, generating a random cipher key to encrypt the header data may prevent the cipher key from being broken by a third party. Therefore, storing the encrypted header data by generating a random file name may prevent the encrypted header data from being easily obtained, so as to further ensure security of the file after the file is encrypted.

In an example embodiment, the partitioning module 603 is specifically configured to partition electronic device may partition the file data other than the header data in the original file into a plurality of segments according to a preset single segment size.

In an example embodiment, the partitioning module 603 is specifically configured to equally or randomly partition the file data other than the header data in the original file into a preset quantity of segments.

In an example embodiment, the disordered fragment sequence storage module 604 is specifically configured to allocate a random new file name for each segment, and store, in a specified file directory or a randomly created file directory, each segment into a segment file that is named after a corresponding new file name.

Figure 7:
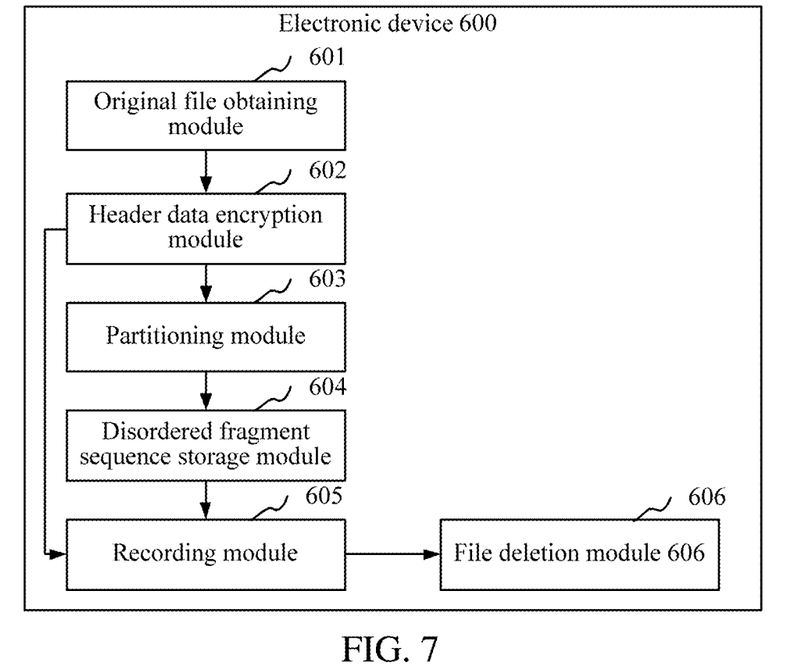
FIG. 7 is a structural block diagram of an electronic device according to another example embodiment.

In an example embodiment, the original file is a streaming media file downloaded by a streaming application. The first storage path, the second storage paths, and the sequence are recorded, corresponding to the file identifier, in a private database corresponding to the streaming application. As shown in FIG. 7, the electronic device 600 further includes a file deletion module 606 that is configured to delete the streaming media file.

In this example embodiment, for requirements on copyright protection of the streaming media file, using the electronic device according to the example embodiments of this application may improve the encryption efficiency while ensuring encryption performance, so as to improve the efficiency of processing the streaming media file.

Figure 8:
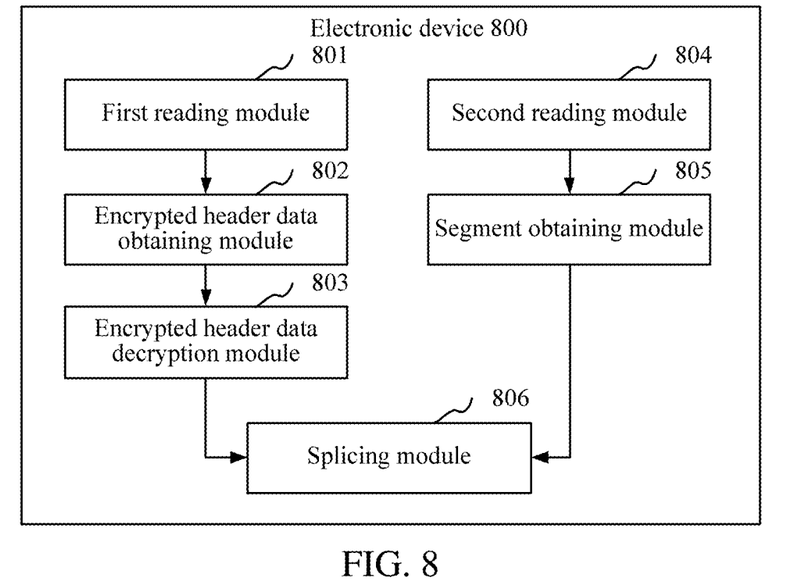
FIG. 8 is a structural block diagram of an electronic device according to an example embodiment.

As shown in FIG. 8, an electronic device 800 is provided according to an example embodiment. The electronic device 800 may include a first reading module 801, an encrypted header data obtaining module 802, an encrypted header data decryption module 803, a second reading module 804, a segment obtaining module 805, and a file splicing module 806.

The first reading module 801 is configured to read a first storage path that corresponds to a to-be-decrypted file identifier and that is configured to store encrypted header data.

The encrypted header data obtaining module 802 is configured to obtain the encrypted header data according to the first storage path.

The encrypted header data decryption module 803 is configured to decrypt the encrypted header data to obtain header data, the header data including metadata of an original file.

The second reading module 804 is configured to read second storage paths that correspond to the file identifier and that are of segments stored in a disordered fragment sequence, and a sequence of the segments in the original file.

The segment obtaining module 805 is configured to obtain the segments according to the second storage paths.

The file splicing module 806 is configured to splice the segments and the header data according to the sequence, to obtain the original file.

According to the foregoing electronic device 800, the encrypted header data is positioned by using the recorded first storage path, and the encrypted header data is decrypted to obtain the header data; and the segments are positioned and obtained by using the recorded second storage paths, so as to splice the header data and the segments according to the recorded sequence, to obtain the original file. During the decryption, only the encrypted header data needs to be performed with a decryption calculation, a data volume for the decryption calculation is small, and time costs for splicing the segments are low. Compared with a current decryption manner of performing binary decryption to an entire text, consumption of a central processor may be significantly reduced by using the electronic device, resulting in low time costs for the decryption. Moreover, the metadata is used to describe data content in the original file. The encrypted header data covers the metadata of the original file, so as to prevent a malicious user from breaking the encryption by positioning the encrypted file by using the metadata and obtaining the segments stored in a disordered fragment sequence.

Figure 9:
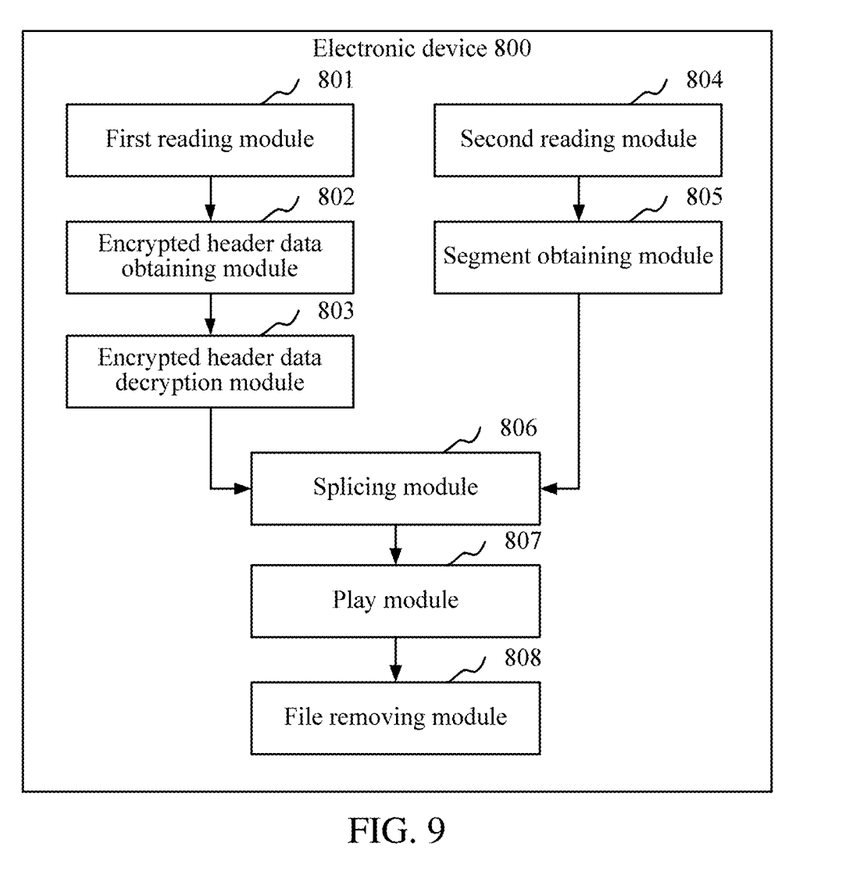
FIG. 9 is a structural block diagram of an electronic device according to another example embodiment.

In an example embodiment, the original file is a streaming media file; and the first storage path, the second storage paths, and the sequence are read from a private database corresponding to a streaming application. As shown in FIG. 9, the electronic device 800 further includes a play module 807 and a file removing module 808.

The play module 807 is configured to play the original file.

The file removing module 808 is configured to remove the original file after the original file is played.

In this example embodiment, the file decryption method is applied to decrypting the streaming media file, so as to improve the decryption efficiency while ensuring an encryption performance. The streaming media file is decrypted instantly when the streaming media file is required to be played, without affecting initial response time and play smoothness of playing the streaming media file, so that the streaming media file is protected, and additional performance consumption brought by the encryption and the decryption is greatly reduced, thereby considering both security and performances, and ensuring rights and interests of a copyright party and user experience.

An electronic device is provided according to an example embodiment. The electronic device may include a memory and a processor, the memory storing computer readable instructions, and the computer readable instructions, when executed by the processor, causing the processor to perform the following steps: obtaining a to-be-encrypted original file; encrypting header data of the original file to obtain encrypted header data and store the encrypted header data, and recording, corresponding to a file identifier of the original file, a first storage path of the encrypted header data, the header data including metadata of the original file; partitioning file data other than the header data in the original file into a plurality of segments; storing the partitioned segments in a disordered fragment sequence; and recording, corresponding to the file identifier, second storage paths of the segments and a sequence of the segments in the original file.

In an example embodiment, the encrypting header data of the original file to obtain encrypted header data and store the encrypted header data, and recording, corresponding to a file identifier of the original file, a first storage path of the encrypted header data includes: generating a random cipher key, and encrypting the header data of the original file according to the cipher key to obtain the encrypted header data; creating a new file having a randomly generated file name, and storing the encrypted header data in the new file; and recording, corresponding to the file identifier of the original file, the cipher key and a first storage path of the new file.

In an example embodiment, the partitioning file data other than the header data in the original file into a plurality of segments includes: partitioning the file data other than the header data in the original file into a plurality of segments according to a preset single segment size; or equally or randomly partitioning the file data other than the header data in the original file into a preset quantity of segments.

In an example embodiment, the storing the partitioned segments in a disordered fragment sequence includes: allocating a random new file name for each of the segments, and storing, in a specified file directory or a randomly created file directory, each of the segments into a segment file that is named after a corresponding new file name.

In an example embodiment, the original file is a streaming media file downloaded by a streaming application; the first storage path, each of the second storage paths, and the sequence are recorded, corresponding to the file identifier, in a private database corresponding to the streaming application; and the computer readable instructions, when executed by the processor, further cause the processor to delete the streaming media file after performing the recording, corresponding to the file identifier, second storage paths of the segments and a sequence of the segments in the original file.

In an example embodiment, the computer readable instructions, when executed by the processor, further cause the processor to perform the following steps: reading a first storage path that corresponds to a to-be-decrypted file identifier and that is configured to store the encrypted header data; obtaining the encrypted header data according to the first storage path; decrypting the encrypted header data to obtain the header data, the header data including the metadata of the original file; reading the second storage paths that correspond to the file identifier and that are of the segments stored in a disordered fragment sequence, and the sequence of the segments in the original file; obtaining the segments according to the second storage paths; and splicing the segments and the header data according to the sequence, to obtain the original file.

In an example embodiment, the original file is a streaming media file; the first storage path, the second storage paths, and the sequence are read from a private database corresponding to a streaming application; and the computer readable instructions, when executed by the processor, further cause the processor to play the original file after performing the splicing the segments and the header data according to the sequence, to obtain the original file, and to remove the original file after play is completed.

According to the foregoing electronic device, only the header data of the original file is encrypted during the encryption of the original file, a data volume for an encryption calculation being small. Moreover, the file data other than the header data in the original file is partitioned into a plurality of segments, and subsequently is stored in a disordered fragment sequence, calculation amounts for partitioning and storing in a disordered fragment sequence being small. Compared with a current encrypting manner of performing binary encryption to an entire text, consumption of a central processor may be significantly reduced by using the electronic device, resulting in low time costs for the encryption. Recording of the first storage path, the second storage paths, and the sequence of the segments enables a file to be decryptable after being encrypted. Moreover, the metadata is used to describe data content in the original file. The encrypted header data covers the metadata of the original file, so as to prevent a malicious user from breaking the encryption by positioning the encrypted file by using the metadata and obtaining the segments stored in a disordered fragment sequence.

In an example embodiment, one or more non-transitory computer-readable storage medium storing computer program code, when executed by one or more processors, causes the one or more processors to perform the following steps: obtaining a to-be-encrypted original file; encrypting header data of the original file to obtain encrypted header data and store the encrypted header data, and recording, corresponding to a file identifier of the original file, a first storage path of the encrypted header data, the header data including metadata of the original file; partitioning file data other than the header data in the original file into a plurality of segments; storing the partitioned segments in a disordered fragment sequence; and recording, corresponding to the file identifier, second storage paths of the segments and a sequence of the segments in the original file.

In an example embodiment, the encrypting header data of the original file to obtain encrypted header data and store the encrypted header data, and recording, corresponding to a file identifier of the original file, a first storage path of the encrypted header data includes: generating a random cipher key, and encrypting the header data of the original file according to the cipher key to obtain the encrypted header data; creating a new file having a randomly generated file name, and storing the encrypted header data in the new file; and recording, corresponding to the file identifier of the original file, the cipher key and a first storage path of the new file.

In an example embodiment, the partitioning file data other than the header data in the original file into a plurality of segments includes: partitioning the file data other than the header data in the original file into a plurality of segments according to a preset single segment size; or equally or randomly partitioning the file data other than the header data in the original file into a preset quantity of segments.

In an example embodiment, the storing the partitioned segments in a disordered fragment sequence includes: allocating a random new file name for each of the segments, and storing, in a specified file directory or a randomly created file directory, each of the segments into a segment file that is named after a corresponding new file name.

In an example embodiment, the original file is a streaming media file downloaded by a streaming application; the first storage path, each of the second storage paths, and the sequence are recorded, corresponding to the file identifier, in a private database corresponding to the streaming application; and the computer readable instructions, when executed by the processor, further cause the processor to delete the streaming media file after performing the recording, corresponding to the file identifier, second storage paths of the segments and a sequence of the segments in the original file.

In an example embodiment, the computer readable instructions, when executed by the processor, further cause the processor to perform the following steps: reading a first storage path that corresponds to a to-be-decrypted file identifier and that is configured to store the encrypted header data; obtaining the encrypted header data according to the first storage path; decrypting the encrypted header data to obtain the header data, the header data including the metadata of the original file; reading the second storage paths that correspond to the file identifier and that are of the segments stored in a disordered fragment sequence, and the sequence of the segments in the original file; obtaining the segments according to the second storage paths; and splicing the segments and the header data according to the sequence, to obtain the original file.

According to the foregoing non-transitory computer-readable storage medium, only the header data of the original file is encrypted during the encryption of the original file, a data volume for an encryption calculation being small. Moreover, the file data other than the header data in the original file is partitioned into a plurality of segments, and subsequently is stored in a disordered fragment sequence, calculation amounts for partitioning and storing in a disordered fragment sequence being small. Compared with a current encryption manner of performing binary encryption to an entire text, consumption of a central processor may be significantly reduced by using the non-transitory computer-readable storage medium, resulting in low time costs for the encryption. Recording of the first storage path, the second storage paths, and the sequence of the segments enables a file to be decryptable after being encrypted. Moreover, the metadata is used to describe data content in the original file. The encrypted header data covers the metadata of the original file, so as to prevent a malicious user from breaking the encryption by positioning the encrypted file by using the metadata and obtaining the segments stored in a disordered fragment sequence.

A person of ordinary skill in the art may understand that all or some of the processes of the methods in the example embodiments may be implemented by a computer program instructing relevant hardware. The program may be stored in a computer-readable storage medium. When the program runs, the processes of the methods in the example embodiments are performed. The storage medium may be a non-transitory computer-readable storage medium such as a magnetic disk, an optical disc, a read-only memory (ROM), a random access memory (RAM) or the like.

Various technical features in the foregoing example embodiments may be combined randomly. For ease of description, possible combinations of various technical features in the foregoing embodiments are not all described. However, the combinations of the technical features should be considered as falling within the scope recorded in this specification provided that the combinations of the technical features are compatible with each other.

The foregoing embodiments only describe several implementations of this application, which are described specifically and in detail, and therefore cannot be construed as a limitation to the patent scope of the present application. It should be noted that, a person of ordinary skill in the art may make various changes and improvements without departing from the ideas of this application, which shall all fall within the protection scope of this application. The foregoing descriptions are merely preferred example embodiments, but are not used to limit the protection scope of any particular claim.

What is claimed is:

1. A method performed by at least one computer processor, the method comprising:
   obtaining an original file to be encrypted;
   encrypting header data of the original file to obtain encrypted header data, the header data comprising metadata of the original file;
   storing the encrypted header data;
   recording, to correspond to a file identifier of the original file, a first storage path of the encrypted header data;
   partitioning file data into segments, wherein the file data is different from the header data in the original file;

storing the segments in a disordered sequence; and
recording, to correspond to the file identifier, second storage paths of the segments along with an actual sequence of the segments in the original file,
wherein the storing the segments comprises:
allocating a random new life name for each of the segments; and
storing, in a specified file directory or a randomly created file directory, each of the segments into a segment file that is named after the random new file name for a respective one of the segments.

2. The method according to claim 1, wherein the encrypting comprises:
generating a random cipher key;
encrypting the header data of the original file, based on the random cipher key, to obtain the encrypted header data; and
creating a new file having a randomly generated file name.

3. The method according to claim 2, wherein the storing the encrypted header data comprises storing the encrypted header data in the new file, and
wherein the recording the first storage path comprises recording, to correspond to the file identifier of the original file, the random cipher key along with the first storage path of the new file.

4. The method according to claim 1, wherein the partitioning further comprises:
partitioning the file data into the segments, based on a preset single segment size.

5. The method according to claim 1, wherein the original file is a streaming media file downloaded by a streaming application,
the first storage path, each of the second storage paths, and the actual sequence are recorded, to correspond to the file identifier, in a private database corresponding to the streaming application, and
after the recording the second storage paths, the method further comprises deleting the streaming media file.

6. The method according to claim 1, further comprising:
reading the first storage path that corresponds to the file identifier to be decrypted;
obtaining the encrypted header data, based on the first storage path;
decrypting the encrypted header data to obtain the header data;
reading the second storage paths that correspond to the file identifier and that are of the segments that are stored in the disordered sequence, along with the actual sequence of the segments in the original file;
obtaining the segments, based on the second storage paths; and
splicing the segments and the header data, based on the actual sequence, to obtain the original file.

7. The method according to claim 6, wherein the original file is a streaming media file,
the first storage path, the second storage paths, and the actual sequence are read from a private database corresponding to a streaming application, and
after the splicing the segments and the header data, the method further comprises:
playing the original file; and
removing the original file after the original file is played.

8. The method according to claim 1, wherein the partitioning further comprises equally or randomly partitioning the file data into a preset quantity of the segments.

9. An electronic device comprising:
at least one memory configured to store computer program code; and
at least one processor configured to access the at least one memory and operate according to the computer program code, the computer program code including:
obtaining code configured to cause the at least one processor to obtain an original file to be encrypted;
encrypting code configured to cause the at least one processor to encrypt header data of the original file to obtain encrypted header data, the header data comprising metadata of the original file;
storing code configured to cause the at least one processor to store the encrypted header data;
recording code configured to cause the at least one processor to record, to correspond to a file identifier of the original file, a first storage path of the encrypted header data;
partitioning code configured to cause the at least one processor to partition file data into segments, wherein the file data is different from the header data in the original file,
wherein the storing code is further configured to cause the at least one processor to store the segments in a disordered sequence,
wherein the recording code is further configured to cause the at least one processor to record, to correspond to the file identifier, second storage paths of the segments along with an actual sequence of the segments in the original file, and
wherein the storing code is further configured to cause the at least one processor to:
allocate a random new file name for each of the segments; and
store, in a specified file directory or a randomly created file directory, each of the segments into a segment file that is named after the random new file name for a respective one of the segments.

10. The electronic device according to claim 9, wherein the encrypting code is further configured to cause the at least one processor to:
generate a random cipher key;
encrypt the header data of the original file based on the random cipher key, to obtain the encrypted header data,
wherein the computer program code further includes creating code configured to cause the at least one processor to create a new file having a randomly generated file name,
wherein the storing code is further configured to cause the at least one processor to store the encrypted header data in the new file, and
wherein the recording code is further configured to cause the at least one processor to record, to correspond to the file identifier of the original file, the random cipher key along with the first storage path of the new file.

11. The electronic device according to claim 9, wherein the partitioning code is further configured to cause the at least one processor to:
partition the file data into the segments, based on a preset single segment size.

12. The electronic device according to claim 9, wherein the original file is a streaming media file downloaded by a streaming application,
the first storage path, each of the second storage paths, and the actual sequence are recorded, to correspond to the file identifier, in a private database corresponding to the streaming application, and after the recording the second storage paths, the electronic device further comprises deleting code configured to cause the at least one processor to delete the streaming media file.

13. The electronic device according to claim 9, further comprising:
reading code configured to cause the at least one processor to read the first storage path that corresponds to the file identifier to be decrypted,
wherein the obtaining code configured to cause the at least one processor to obtain the encrypted header data based on the first storage path,
wherein the electronic device further comprises:
decrypting code configured to cause the at least one processor to decrypt the encrypted header data to obtain the header data,
wherein the reading code is further configured to cause the at least one processor to read the second storage paths that correspond to the file identifier and that are of the segments that are stored in the disordered sequence, along with the actual sequence of the segments in the original file, and
wherein the obtaining code is further configured to cause the at least one processor to:
obtain the segments based on the second storage paths; and
splicing the segments and the header data based on the actual sequence, to obtain the original file.

14. The electronic device according to claim 13, wherein the original file is a streaming media file,
the first storage path, the second storage paths, and the actual sequence are read from a private database corresponding to a streaming application, and
after the splicing the segments and the header data, the electronic device further comprises:
playing code configured to cause the at least one processor to play the original file; and,
removing code configured to cause the at least one processor to remove the original file after the original file is played.

15. The electronic device according to claim 9, wherein the partitioning code is further configured to cause the at least one processor to:
equally or randomly partitioning the file data into a preset quantity of the segments.

16. A non-transitory computer-readable storage medium storing computer readable instructions, the computer readable instructions, when executed by at least one processor, causing the at least one processor to perform:
obtaining an original file to be encrypted;
encrypting header data of the original file to obtain encrypted header data, the header data comprising metadata of the original file;
storing the encrypted header data;
recording, to correspond to a file identifier of the original file, a first storage path of the encrypted header data;
partitioning file data into segments, wherein the file data is different from the header data in the original file;
storing the segments in a disordered sequence; and
recording, to correspond to the file identifier, second storage paths of the segments and along with an actual sequence of the segments in the original file,
wherein the storing the segments comprises:
allocating a random new file name for each of the segments; and
storing, in a specified file directory or a randomly created file directory, each of the segments into a segment file that is named after the random new file name for a respective one of the segments.

17. The non-transitory computer-readable storage medium according to claim 16, wherein the instructions further cause the at least one processor to perform:
generating a random cipher key,
encrypting the header data of the original file, based on the random cipher key, to obtain the encrypted header data;
creating a new file having a randomly generated file name,
storing the encrypted header data in the new file; and
recording, to correspond to the file identifier of the original file, the random cipher key along with the first storage path of the new file.

18. The non-transitory computer-readable storage medium according to claim 16, wherein the instructions further cause the at least one processor to perform:
partitioning the file data into the segments, based on a preset single segment size; or
equally or randomly partitioning the file data into a preset quantity of the segments.

19. The non-transitory computer-readable storage medium according to claim 16, wherein the original file is a streaming media file downloaded by a streaming application,
the first storage path, each of the second storage paths, and the actual sequence are recorded, to correspond to the file identifier, in a private database corresponding to the streaming application, and
after recording the second storage paths, the instructions further cause the at least one processor to perform deleting the streaming media file.

20. The non-transitory computer-readable storage medium according to claim 16, wherein the instructions further cause the at least one processor to perform:
reading the first storage path that corresponds to the file identifier to be decrypted;
obtaining the encrypted header data, based on the first storage path;
decrypting the encrypted header data to obtain the header data;
reading the second storage paths that correspond to the file identifier and that are of the segments that are stored in the disordered sequence, along with the actual sequence of the segments in the original file;
obtaining the segments, based on the second storage paths; and
splicing the segments and the header data, based on the actual sequence, to obtain the original file.

* * * * *